March 28, 1950 W. R. KOCH 2,501,820

INTERCOMMUNICATION SYSTEM

Filed April 29, 1948

INVENTOR
WINFIELD R. KOCH
BY Philip G. Cooper
ATTORNEY

Patented Mar. 28, 1950 2,501,820

UNITED STATES PATENT OFFICE 2,501,820

INTERCOMMUNICATION SYSTEM

Winfield R. Koch, Marlton, N. J., assignor to Radio Corporation of America, a corporation of Delaware Application April 29, 1948, Serial No. 24,071

20 Claims. (Cl. 179—1)

This invention relates to intercommunicating systems and particularly to those systems having a plurality of signal stations in which one or more stations can communicate with one or more other stations.

Among the objects of the present invention is the provision of novel intercommunicating systems of simple construction in which only a single pair of conductors is used to carry the signals in either direction between a plurality of signal stations.

The above as well as other objects of the invention will be more readily understood from the following description of exemplifications thereof, reference being had to the accompanying drawings wherein.

Figures 1, 2, 3, 4, 5, 6:
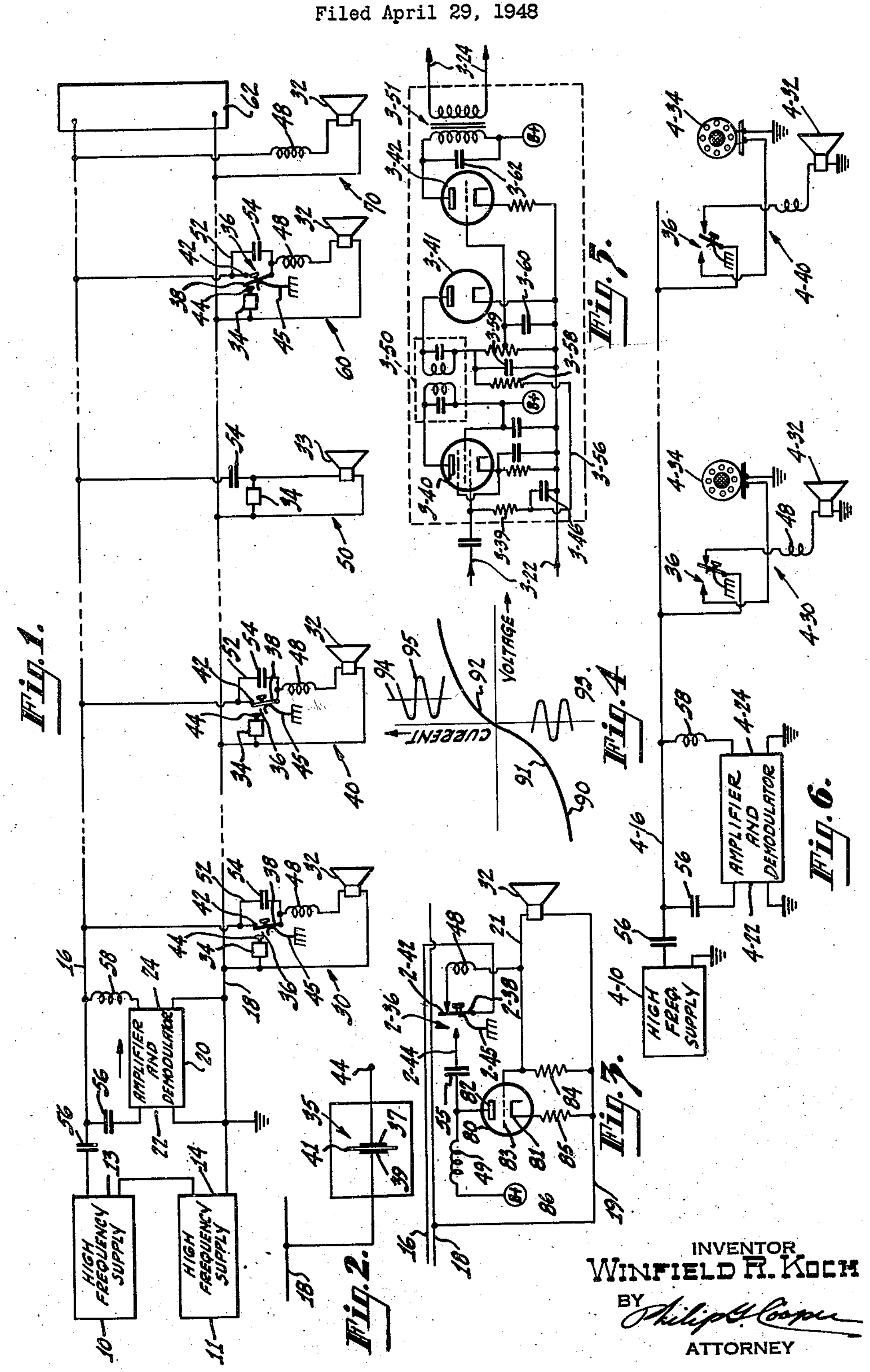
Fig. 1 is a schematic showing of one form of intercommunicating system embodying the invention.
Fig. 2 is a circuit diagram of one form of modulating arrangement for use with the invention.
Fig. 3 is a circuit diagram of a different modification of modulator arrangement for use with the invention.
Fig. 4 is a curve diagram illustrating a further type of modulation embodied in the invention.
Fig. 5 is a circuit diagram of one type of amplifier and demodulator elements according to the invention.
Fig. 6 is a different modification of communication system incorporating the invention.

According to the invention, an intercommunicating system contains a plurality of stations, a single pair of conductors supplied with high frequency electric waves interconnecting all the stations, and arranged so that at any one of a plurality of stations the high frequency waves may be modulated to deliver to the conductors signal-modulated carrier currents which are converted into signal currents and fed to one or more other stations in which the signals are reproduced. By "single pair of conductors" is meant two different electrical conducting paths, one of which may merely be a ground connection as in normally used to establish a complete electric circuit. With such a ground connection forming one of the conductors only one actual conductor need be used to interconnect the stations and to provide the "pair of conductors."

Referring to the drawing, the form of the invention there shown includes high frequency sources 10, 11 having output leads 13, 14 for delivering high frequency electrical waves to the intercommunication conductors 16, 18, one of which may be grounded as shown. One suitable form of the high frequency sources is the conventional vacuum tube oscillator. The output leads 13, 14 may be connected across the line in parallel or in series as shown. A combined amplifier and demodulator indicated at 20 has input leads 22 and output leads 24 coupled to the line through capacitance 56 and choke 58 respectively for selectively amplifying and detecting signal-modulated waves appearing in the line and delivering back to the line amplified currents corresponding to the signals such as acoustic signals desired to be intercommunicated.

At desired portions of the line formed by the pair of conductors, a plurality of intercommunication stations 30, 40, 50, 60, 70 are shown as connected. Stations 30, 40, 60 are of one type and each includes a transducer 32, such as a dynamic or piezoelectric acoustic reproducer, a modulator 34 and a shifting switch 36. The switch 36 selectably connects the transducer 32 either to the line 16, 18 for producing acoustic signals corresponding to low frequency signal currents in the line or it connects the transducer 32 to the modulator 34 and the modulator to the line for causing signal modulation of the high frequency waves supplied to the line by the sources 10, 11.

The shifting switch 36 is shown as of single pole, double throw construction having a blade 38 movable from a normal position, shown at stations 30, 40 in which it is held against a contact 42 as by the bias spring 45, to an operated position shown at station 60, in which it may be held, manually for example, against a second contact 44. The blade itself is connected to one lead of transducer 32 through choke coil 48, and the other lead of the transducer 32 is shown as connected to conductor 18. Capacitor 54 in connection 52 serves to also connect the blade 38 with the other line conductor 16. Contact 42 is also connected to the conductor 16 and contact 44 is connected to the input of modulator 34 which may merely be a so-called "crystal" detector. The switch 36 functions as a "push to talk" switch.

The system of the invention may also include any number of one-way "talk" or "listen" stations. In a "talk" station, such as 50, locally produced acoustic signals modulate the high frequency waves on the line for transfer to other stations only. In a "listen" station, such as 70, only listening to signals on the line can be effected.

In operation, one of the switches 36 may be actuated to the "talk" position as shown at station 60 and acoustic signals then supplied to the corresponding transducer. The high frequency currents supplied by sources 10 and 11 are thereby applied to the associated modulator 34 through capacitor 54, and at the same time, low frequency electric signals corresponding to the acoustic signals are also applied to the modulator. As a result, the electric waves beat together to form beat signals modulated in accordance with the acoustic signals supplied. This results from the well known heterodyne action of modulators such as "crystal" detectors, which are non-linear conductors. Under these conditions there accordingly appear in the line electric signals having beat frequencies corresponding to the sums of the fundamental and harmonic frequencies of the different waves supplied by sources 10, 11, as well as beat frequencies corresponding to the differences between these fundamental and harmonic frequencies. The beat signals carry modulations or amplitude variations corresponding to the acoustic signals because of the simultaneous heterodyning with the electric signals supplied by the transducer.

All the modulated beat signals are carried by the line and appear at the input 22 of the amplifier and demodulator 20 which may be arranged to selectively amplify and demodulate a band of frequencies corresponding to one of the modulated beat signals. As a result, amplified electric signals corresponding to the original acoustic signals appear in the line and are delivered to all listening stations. Here they pass to the transducers where acoustic signals are reproduced for listeners to hear. Two way communication such as ordinary conversation may be had by holding switch 36 in its operated "talk" position when sending and releasing the switch to receive messages.

Although one form of modulator 34, as described above, is a crystal detector, the modulator may be of any other conventional construction such as the non-linear current conductors commercially known as rectifiers or detectors. Examples of the so-called "crystal" type are those embodying a crystal of natural lead sulfide (galena), germanium, selenium or other materials having a greater electrical conductivity in one direction than in the opposite direction. Alternative forms of modulator are those of the laminated type having a semi-conductive stratum specially formed and sandwiched between special conductive layers to provide similar non-linear conductivity as in the copper oxide, copper sulfide or commercial selenium rectifiers. Other examples of suitable modulators are space discharge devices such as the so-called "vacuum" tubes where currents pass in only one direction from an electron emitting cathode to an electron collecting plate. The "vacuum" tubes may also include one or more electron passage controlling grids which may be connected for effecting some or all of the heterodyning functions, as is well known in the art. The space discharge modulators generally require a heat energy supply to actuate the cathode for emitting electrons.

Fig. 2 shows the details of one type of modulator arrangement utilizing a selenium rectifier. The modulator 34 is merely the rectifier 35 which has two terminal electrodes 37, 39 held against an intervening layer of selenium 41 on one face of which is formed the special so-called "barrier layer" as is well-known in the art. One electrode 37 is directly connected to the switch terminal 44, and the other electrode 39 is connected to the line conductor 18 in the manner described in connection with Fig. 1. The arrangement of Fig. 2 is also suitable for modulators of the "vacuum" tube diode type where the diode connections are made as shown for the rectifier terminals 37, 39. The rectifier may be connected with its more highly conductive path, or polarity, in either direction.

Fig. 3 shows another form of modulating arrangement utilizing a grid control type of electron discharge tube. The electron discharge tube shown as a triode 80 having an electron emissive cathode 81, an electron collecting electrode or plate 82 and electron passage controlling grid. Switch 2—36 shown in the non-operated position in which movable contact blade 2—38 is held by bias 2—45 against fixed contact where it connects the line conductor 16 with a transducer 32 through blocking choke 48 and connection 21. The switch blade 2—38 may be moved to an operated position in which it engages fixed contact 2—44 and connects the line 16 to the plate 82 through blocking capacitor 55. The circuit to transducer 32 and tube 80 is completed by the conductor 19 and line conductor 78, as shown. Transducer connection 21 is also linked to tube grid 83 and may be connected to the cathode through grid return resistor 84 and cathode return resistor 85. Plate voltage for operating the tube 80 may be supplied by having the high frequency waves delivered by the respective sources to the line, of sufficiently high voltage, as for example about 10 volts R. M. S. Alternatively, a separate plate current source 86 may have its positive terminal connected between the blocking condenser 55 and the plate 82 through a choke 49. The negative terminal of the plate current source may be grounded. Where no separate plate current source 86 is used, the choke 49 as well as the blocking capacitor may be omitted leaving the plate 82 directly connected to contact 2—44. If desired the separate plate current source may be included in a high frequency wave source 10, 11 or in the combined amplifier and demodulator 20. The transducer may then be isolated from the D. C. plate current by a blocking capacitor.

The grid return resistor 84 establishes a return flow path for electrons emitted in the tube 80 and collected on the grid; this resistor is not needed where the grid return circuit established by the transducer 32 has a sufficiently low resistance. The cathode return resistor 85 develops a bias voltage when current passes through the tube and applies this voltage as a negative bias on the grid with respect to the cathode for limiting the current flow as desired. This resistor may also be eliminated if desired.

Cathode 81 generally requires heating for proper operation. This may be accomplished in the conventional manner, either indirectly or directly, by a separate source of electric current. If desired the high frequency energy supplied to the line 16, 18 may be used for also heating the cathode, particularly where cathode 81 is of the directly heated type requiring a very small amount of heating power. For such purpose a high frequency transformer may be connected to deliver high frequency currents from the line 16, 18 at a reduced voltage to suitable rectifier elements which in turn supply the cathode heating current. The cathode, even if of the directly heated type, may also be heated by unrectified low voltage line energy.

The switching circuit need not be in the plate circuit of Fig. 3, but may alternatively be in the grid circuit and arranged to shift the connection of the transducer 32 to the line 16, 18, or to the grid 83. If desired a double-pole switch may be adapted to simultaneously switch both plate and grid circuits. The tube 80 may have additional grids such as screen grids, a suppressor grid and/or other signal mixing grids.

Also suitable for modulators are other types of non-linear conductors such as those that exhibit impedance changes in response to changes in applied voltage. Thus, tungsten conductors, or the silicon carbide elements described in U. S. Patent No. 1,822,742, granted September 8, 1931, may be used. With this type of non-linear conductor the electrical conductivity in opposite directions is substantially identical, and the curvilinear relationship between conductivity and voltage is in the form of two symmetrical oppositely curving sections on each side of the zero-voltage level. The A. C. signals to be modulated may be biased by a direct current signal large enough to carry all the signal variations without changing its direction to minimize any frequency doubling effect of oppositely curved non-linear conductivities on both sides of the zero signal level.

Fig. 4 is a curve diagram illustrating the modulating operation according to this form of the invention. Curve 90 represents a typical example of the current flowing through a non-linear resistor of the variator type, under varying voltages. The curve has two symmetrical portions 91, 92 joined at their zero-voltage points. Alternating current signals to be modulated if directly applied in unbiased condition to the variator are represented by the simple waves 93 and it will be noted that each cycle of the waves 93 brings the variator through first one and then the other of the oppositely curved conductivity zones 91, 92. There accordingly tends to develop two separate modulation surges at each cycle of the signals to be modulated and the desired signals may be difficult to derive from the modulated output without dividing the output frequencies in half. However, when the signals to be modulated are confined to only one curved portion of the conductivity cure such as 91 or 92, as by superimposing on these signals a D. C. bias 94 sufficient to shift the A. C. signals to the condition shown at 95, for example, this difficulty is avoided. The D. C. bias may be supplied by any of the arrangements described above to provide the D. C. plate current for the construction of Fig. 3.

The choke coils 48 are low pass blocking elements used for increasing the impedance presented by the transducer 32 to the line where desirable to thereby diminish loading of the high frequency sources 10, 11 when the stations are in receiving or listening position as shown at 30, 40, 70, and the transducer is of low impedance to the high frequency waves. The blocking elements 48 function by acting as a high impedance to high frequency waves and at the same time constituting a low impedance to the signals supplied by the transducer. Other conventional low pass blocking elements such as low pass filters may be substituted or the blocking elements may be entirely omitted. Choke coil 58 is similarly used to diminish the loading effect of the output 24 of amplifier-demodulator 20 on the high frequency supplies, where this feature is desired. The input 22 of the amplifier-demodulator may itself be of relatively high impedance as for example the normal input resistance of an electronic amplifier circuit, so that it need not be blocked.

Capacitors 54 are high pass blocking elements to diminish the loading effect on a transducer supplying electric signals, of the connected circuit elements including the other transducers that are connected for receiving electric signals from the line. These blocking elements function by acting as a high impedance to the electric signals supplied by the local transducer 32 preventing them from directly reaching the line 16, 18, and at the same time acting as low impedance connections for the high frequency waves transmitted on the line to supply these waves to the modulator 34.

Where the transducers are of the high impedance type such as the piezoelectric or polarized capacitor types, and they do not appreciably load the high frequency supply, the low pass blocking elements 48 are not needed. Station 50 is shown as incorporating a high impedance transducer 33 in such a construction. The high impedance referred to is the impedance to the high frequency currents on the line and in those transducers having a high resistance, but also incorporating a capacitance of such magnitude as easily to pass the high frequencies, blocking elements may be retained. The blocking action may also be provided by forming a parallel resonant circuit with a capacitance such as the transducer capacitance, and tuning the circuit to approximately those frequencies to be blocked.

Where the line presents a relatively high impedance to the low frequency electric signals supplied by the transducers, and thereby does not tend to shunt and decrease the effectiveness of the modulators 34, the blocking elements 54 are unnecessary. These blocking elements are also unnecessary in stations such as 70 in which no "talk" function is provided.

Capacitors 56 are high pass blocking elements incorporated in the output connections of the supply sources 10, 11 and in the input 22 of the amplifier and demodulator 20. These elements diminish the loading effect of the connected structures on the low frequency signals supplied by the amplifier and demodulator 20. Where the input 22 of the amplifier and demodulator is of the high impedance type such as a space discharge tube input, the blocking element 56 may be omitted, the selectivity of the amplifier-demodulator 20 being then relied on to prevent oscillation.

Fig. 5 is a circuit diagram of one form of amplifier-demodulator 3—20 having a high impedance input 3—22. This arrangement includes a first high frequency amplifying stage including electron discharge tube 3—40, a selective coupling circuit including high frequency transformer 3—50 coupling the high frequency output of the first stage to a demodulator stage including detector tube 3—41, and a final low frequency amplifier stage including tube 3—42. The low frequency output is shown as supplied to final output 3—24 through a low frequency coupling transformer 3—51. The various stages are operated in conventional manner as shown. The input impedance of this arrangement is essentially that of the grid return resistor 3—39 connected across the input 3—22 in series with bypass capacitor 3—46. Automatic volume control is shown as incorporated in the amplification by the connection 3—56 which supplies variable bias voltage to the input grid of tube 3—40 from the detector output through filtering resistor 3—58, as is well known.

Adequate selectivity is incorporated through the highly selective band-pass characteristics of high frequency transfer 3—50, to prevent uncontrolled feedback of the low signal frequencies from output 3—24 to the input of stage 3—42 through the line and input 3—22. Uncontrolled feedback of high frequency carrier from the output of detector 3—41 to the input 3—22 is prevented by the filtering of the detector output with condensers 3—59, 3—60, and if desired, a high frequency by-pass condenser 3—62 in the output of tube 3—42.

The amplifier-demodulator circuit may be modified as by using any other type of demodulator a crystal detector for example, or by interchanging the number of amplification stages and the sequence of amplification and demodulation. Some or all of the tubes may be combined as different sections of a common vacuum tube envelope and the tube sections may be of the triode, tetrode or pentode types.

The conductors 16, 18 may form an intercommunicating line of either high or low impedance and the line may be terminated in a terminating element 62 having a corresponding impedance to reduce resonant and reflecting actions of the line. Inasmuch as the number of transducers "talking" and the number of "listening" are always approximately the same, no significant complications arise because of variations in loading or switching of the impedances of the various units of the system. Where the line is relatively long, it may be of low loss type to increase its transfer efficiency. A coaxial line in which one of the conductors is substantially completely surrounded by the other is one example of the low loss type. In those forms where one conductor of the line is grounded, only a single conductor such as conductor 16 need be specially wired to all the stations, an effective ground connection at each unit taking the place of conductor 18. With the coaxial type line, the outer conductor may be grounded and in any event need not be exteriorly insulated from ground if the central conductor is ungrounded.

As examples for the practical operation of the invention to communicate signal variations having frequencies in a range below 3000 cycles per second, and without limiting the invention in any way, the sources 10, 11 may supply currents having frequencies of 30,000 and 50,000 cycles per second respectively and the amplifier and demodulator 20 may be arranged for selectively amplifying and demodulating a 6000 cycle band of frequencies having a mid-band frequency of 80,000 cycles per second. Other parameters may also be effectively used. Thus, for example, the sources 10, 11 may supply energy at frequencies as high as several megacycles per second or as low as about twice the highest signal frequency to be transferred. The beat frequencies selected for amplification may be the difference between the two source frequencies or any other algebraically related derivative such as the sum or difference between one frequency and two times the other frequency. When using the line to transmit energy at only relatively low frequencies, of the order of 100,000 cycles per second or less, the reflecting and resonating effects of the transmission line can in general be ignored inasmuch as unless the line becomes about one-eighth of a mile long or longer, it forms only a negligible portion of the wave length.

The combined amplifier and demodulator may be of any conventional construction as, for example, the ordinary intermediate frequency amplifier, detector and audio amplifier stages of a standard heterodyne type radio receiver. A radio of this type may be incorporated in the system in this manner, so that the converter section of the radio may be selectably connected for transferring the incoming radio signals to the listening stations. The selected beat frequency of the system may be arranged to be the same as the intermediate frequency of the radio, normally centered at about 455 kilocycles per second. An automatic volume control arrangement may be included in the amplifier, as shown above for example, to compensate for variations in intensity of the modulated signals coming from stations at different distances from the amplifier and demodulator 20. The amplifier and demodulator may alternatively or concomitantly be located approximately centrally between the ends of the line to reduce the overall difference between the shortest and longest signal transfer paths and thereby diminish signal intensity differences. A suitable form of the invention includes the energy sources 10, 11 and the amplifier-demodulator 20 in a single assembly conveniently located and having a simple two-conductor connection to the line.

According to a modification of the invention, the electrical energy supplied for signal modulation at the intercommunication stations 30, 40, 50 and 60, for example, may be a carrier current of only a single frequency. The operation of this form of the invention is similar to that described above, except for the fact that the amplifier-demodulator 20 is arranged to selectively receive and demodulate a band of frequencies centering about the supply frequency. Inasmuch as the supply energy is of relatively large magnitude with respect to the modulated energy, the amplifier-demodulator may be arranged to apply all or most of its amplification to the demodulated signal to minimize the possibility of overloading and distortion in high frequency amplification stages.

In this simplified form of the invention the signal modulation may be provided by non-linear conductors or by other impedance varying devices such as the conventional carbon microphone. As acoustic signals are supplied to such a microphone, the carbon particles are variably compressed to vary the microphone impedance and correspondingly vary the amplitude of carrier current passed. A separate acoustic reproducer may be used in such constructions.

Fig. 6 shows one embodiment of this phase of the invention. A high frequency supply 4—10 delivers high frequency electric waves to a line conductor 4—16 through blocking capacitor 56. These waves are distributed among a set of intercommunication stations two of which are shown at 4—30, 4—40, the circuit being completed by the ground connections shown. The stations include a variable impedance microphone 4—34, an acoustic signal reproducer 4—32, and a switch 36 biased to connect the line with the reproducer 4—32 and capable of being operated to disconnect the reproducer and substitute a connection to the microphone 4—34. Choke coil 48 is inserted between the switch 36 and the reproducer 4—32 to increase its impedance to the high frequencies in line 4—16 where desired.

An amplifier-demodulator 4—20 has an input 4—22 and an output 4—24 connected to line 4—16 through a blocking capacitor 56 and blocking choke coil 58 respectively. The amplifier-demodulator 4—20 may be similar to that shown in Fig. 5 above, and may have its input directly led into the detector stage through a band pass coupling transformer such as shown at 3—50. Alternatively the input may be through only a single parallel resonant circuit such as the output side of transformer 3—50.

The operation of the form of the invention shown in Fig. 6 is similar to that described above in connection with Figs. 1 through 5. If desired the microphone 4—44 and the reproducer 4—32 may be acoustically isolated from each other as in a conventional telephone hand-set for example, and the switch 36 omitted leaving them both connected on the line. In this arrangement the delivery of intercommunication signals to a microphone need not be preceded by a switch operation and a conversation may be carried on with greater ease.

The form of the invention shown in Fig. 1 may also utilize separate microphones and acoustic reproducers with suitable switching arrangements provided to properly shift from "talk" to "listen." In this type of construction the modulator may, in addition to the non-linear conductor types, also be of the variable impedance type described in connection with the carbon microphone.

Instead of the modulating systems described above, the intercommunicating stations may be provided with other systems to produce frequency, phase or pulse modulation of the carriers in any conventional manner. Such modulating arrangements are well known to experts in the art and need no further description here.

While several exemplifications of the invention have been indicated and described above, it will be apparent to those skilled in the art that other modifications may be made without departing from the scope of the invention as set forth in the appended claims.

What is claimed is:

1. In an intercommunication system for carrying signals in either direction between a plurality of signal stations: a pair of conductors for carrying the signals, said conductors forming a line connected to each station for delivering high frequency alternating electric waves to the stations; at least two stations having modulating means for connection to the line to produce signal-modulated waves by modulating the delivered waves in accordance with low frequency signals supplied to the modulating means for intercommunication, and to supply said signal-modulated waves to the line; amplifying and demodulating structure having input and output connections to the line for receiving said signal-modulated electric waves from the line and delivering back to the line amplified signal waves corresponding to the low frequency signal modulations; said last mentioned stations also including receiving elements for receiving said signal waves from the line.

2. In an intercommunication system for carrying signals in either direction between a plurality of signal stations: a pair of conductors for carrying the signals, said conductors forming a line connected to each station; supply structure connected to the line for delivering alternating electric waves of two different high frequencies to the line; at least two stations having modulating means including signal transducer elements for connection to the line to produce signal-modulated waves in which the modulations correspond to low frequency signals supplied to the transducer elements for intercommunication; amplifying and demodulating structure having input and output connections to the line for receiving said signal-modulated electric waves and delivering back to the line amplified signal waves corresponding to the low frequency signal modulations; said last mentioned stations also including shift means connected for selectably connecting the transducing elements to the line for receiving and reproducing signals carried as signal waves by the line, and selectably connecting the modulating means to the line for producing said signal-modulated waves.

3. The combination as defined by claim 2 in which the amplifying and demodulating structure includes selector elements for limiting the amplification to waves in a band of frequencies corresponding to those resulting from the cross modulation between the two different high frequency waves delivered by the supply structure.

4. The combination as defined by claim 2 in which the supply structure is connected to one section of the line for delivering the high frequency waves to all the stations.

5. The combination as defined by claim 2 in which the line has a characteristic impedance and includes terminating structure having an impedance approximating the characteristic impedance of the line, to diminish resonance effects.

6. The combination as defined by claim 1 in which the line has an effective electrical length corresponding to a small fraction of the wave length of the currents delivered by the supply structure to diminish the interference by reflections of these currents from an end of the line.

7. The combination as defined by claim 1 in which the amplifying and demodulating structure input connection is to a single section of the line, and the amplifying and demodulating structure output connection is to a single section of the line, for providing the amplification and demodulation of the signal-modulated currents delivered by all the stations.

8. The combination as defined by claim 1 in which the modulating means is a variable-load modulator.

9. The combination as defined by claim 1 in which the modulating means is a heterodyning modulator.

10. The combination as defined by claim 2 in which the transducer elements include an electro-acoustic apparatus for interchangeably converting acoustic energy into corresponding electric signals and electric signals into corresponding acoustic energy.

11. The combination as defined by claim 2 in which the amplifying and demodulating structure includes selector elements for limiting the amplification to waves in a band of frequencies corresponding to those resulting from cross modulation between the two different high frequency waves delivered by the supply structure; the supply structure includes an output connection to one section of the line for delivering the high frequency waves to all the stations; the amplifying and demodulating structure input connection and output connection being each to single sections of the line for providing the amplification and demodulation of the signal-modulated currents delivered by the stations; said output connection includes blocking structure for increasing the impedance presented by the output to high frequency currents in the line; the modulating means is a rectifier; the transducer elements include low impedance electroacoustic apparatus for interchangeably converting acoustic energy into corresponding electric signals and electric signals into corresponding acoustic energy; and the last mentioned stations include blocking elements for impeding the passage of the high frequency currents through the transducer and impeding the passage of low frequency signal currents to the line.

12. In an intercommunication system for carrying signals in either direction between a plurality of signal stations: a pair of conductors for carrying the signals, said conductors forming a line connected to each station for delivering high frequency alternating electric waves to the stations; at least two stations having modulating means for connection to the line to produce signal-modulated waves in which the modulations correspond to low frequency signals supplied to the modulating means for intercommunication; amplifying and demodulating structure having input and output connections to the line for receiving said signal-modulated electric waves and delivering back to the line amplified currents corresponding to the low frequency signal modulations; said last mentioned stations also including receiving elements and selectably operable shift means connected for selectably connecting the receiving elements to the line for receiving signals carried as signal currents by the line and selectably connecting the modulating means to the line for producing said signal-modulated waves.

13. In an intercommunication system for carrying signals in either direction between a plurality of signal stations: a pair of conductors for carrying the signals, said conductors forming a line connected to each station for delivering high frequency alternating electric waves to the stations; at least two stations having modulating means for connection to the line to modulate said high frequency waves and produce signal-modulated waves in which the modulations correspond to low frequency signals supplied to the modulating means for intercommunication; amplifying and demodulating structure having input and output connections to the line for receiving said signal-modulated electric waves and delivering back to the line amplified currents corresponding to the low frequency signal modulations; said last mentioned stations also including transducing elements and selectably operable shift means connected for selectably connecting the transducing elements to the line for receiving and reproducing signals carried as signal currents by the line and selectably connecting the modulating means to the line for producing said signal-modulated waves.

14. In an intercommunication system for carrying signals in either direction between a plurality of signal stations: a pair of conductors for carrying the signals, said conductors forming a line connected to each station; supply structure coupled to the line for delivering high frequency alternating electric waves to the stations; at least two stations having modulating means for connection to the line to modulate said high frequency waves and produce signal-modulated waves in which the modulations correspond to low frequency signals supplied to the modulating means for intercommunication; amplifying and demodulating structure having input and output connections to the line for receiving said signal-modulated electric waves and delivering back to the line amplified currents corresponding to the low frequency signal modulations; said last mentioned stations also including transducing elements and selectably operable shift means connected for selectably connecting the transducing elements to the line for receiving and reproducing signals carried as signal currents by the line and selectably connecting the modulating means to the line for producing said signal-modulated waves.

15. The combination as defined by claim 14 in which the supply structure and the amplifying and demodulating structure form parts of a single structural combination having a single connection to each line conductor for supplying the high frequency waves, the amplification and the demodulation for all the stations.

16. In a signal station construction for an intercommunication system having a conducting line connecting a plurality of signal stations: signal transmitting elements for supplying electrical signals to the line for transmission to a different station; said transmitting elements including modulating means connected for supplying the electric signals by selectably modulating electric waves carried by the line, in accordance with signals delivered to the transmitting elements for intercommunication; and receiving elements connected for receiving demodulated electric signals carried by the same line and corresponding to the signals transmitted by a different station.

17. In a signal station construction for an intercommunication system having a conducting line connecting a plurality of signal stations: signal transmitting elements for supplying electrical signals to the line for transmission to a different station; said transmitting elements including modulating means for supplying the electric signals by modulating electric waves carried by the line to the transmitting elements in accordance with signals to be transmitted, for operation essentially by the electric wave energy supplied from the line; receiving elements for receiving demodulated electric signals carried by the line and corresponding to the signals transmitted by a different station; and selectably operable shift means for selectably connecting the modulating means to the line for transmitting signals, and selectably connecting the receiving elements to the line for receiving signals.

18. The combination as defined by claim 17 in which the signal transmitting elements include electro-acoustic transducing means for delivering electric signals to the modulating means corresponding to supplied acoustic signals, and delivering acoustic signals corresponding to supplied electric signals; said transducing means being connected to the shift means to selectably form part of the transmitting elements for transmitting signals and part of the receiving elements for receiving signals.

19. In a method of intercommunicating signals from a first signal station to at least one other signal station over a single pair of conductors interconnecting the stations: supplying high frequency electric waves to the pair of conductors for transmission to the stations; modulating the high frequency waves at said first signal station in accordance with low frequency signals to be communicated to form signal modulated electric waves carried by the conductors; amplifying and demodulating the signal modulated electric waves carried by the conductors; and supplying the demodulated amplified output to the conductors for communication to and reception by at least one other station.

20. In an intercommunication system for carrying signals in either direction between a plurality of signal stations: a pair of conductors for carrying the signals, said conductors forming a line connected to each station for delivering high frequency alternating electric waves to the stations, receiving modulations of said waves from at least one of the stations, and also carrying low frequency alternating electric waves; supply elements connected for supplying said high frequency waves to the line; at least one station having a modulator connected for selectably modulating the waves delivered by the line in accordance with low frequency signals supplied to the modulator for intercommunication; amplifying and demodulating structure having input and output connections to the line for receiving said signal-modulated electric waves from the line and delivering back to the line amplified signal waves corresponding to the low frequency signal modulations; said last mentioned station also including transducer elements connected for receiving said signal waves and reproducing said low frequency signals.

WINFIELD R. KOCH.

REFERENCES CITED

The following references are of record in the file of this patent:

UNITED STATES PATENTS

| Number | Name | Date |
|---|---|---|
| 1,361,488 | Osborne | Dec. 7, 1920 |
| 1,579,256 | Smythe | Apr. 6, 1926 |
| 1,633,100 | Hersing | June 21, 1927 |
| 1,666,738 | Hartley | Apr. 17, 1928 |
| 1,746,808 | Wolfe | Feb. 11, 1930 |
| 1,885,010 | Day | Oct. 25, 1932 |